Sept. 22, 1942. S. R. GATELY 2,296,608
CUTTER HEAD FOR FEED GRINDERS
Filed Nov. 27, 1939
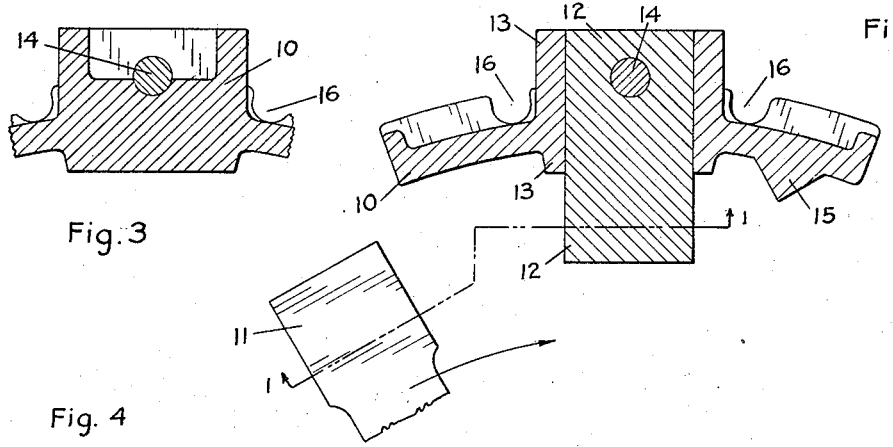
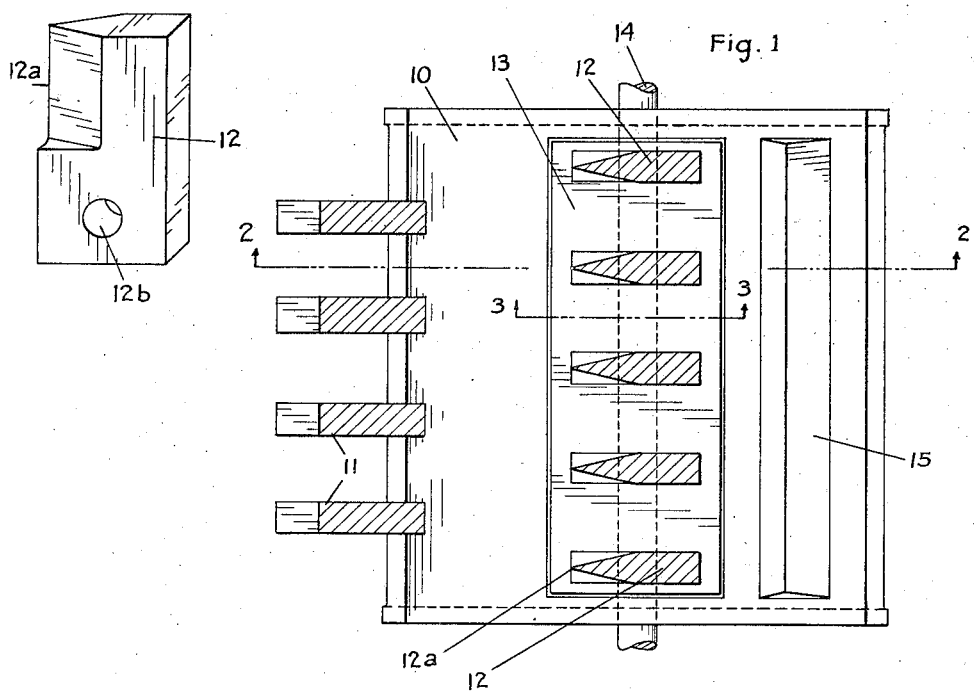
INVENTOR.
Stephen R. Gately
BY
ATTORNEY.

Patented Sept. 22, 1942

2,296,608

UNITED STATES PATENT OFFICE 2,296,608

CUTTER HEAD FOR FEED GRINDERS

Stephen Raymond Gately, Syracuse, Nebr.

Application November 27, 1939, Serial No. 306,313

4 Claims. (Cl. 83—6)

My invention relates to feed grinders, its primary object being the provision of cutters for reducing fibrous feed as a preliminary step in the grinding operation.

Another object of the invention is the provision of a cutter head which will adapt the grinder to operate on tough fibrous feed as well as on grains.

Another object is the provision of a cutter head for feed grinders, the cutter head being readily insertable into and removable from the grinder.

Another object is the provision of a cutter head having removable and replaceable knives.

A very important object of the invention is the provision of a stationary cutter having spaced parallel knives so arranged that the hammers of the reel will travel through the spaces between the knives.

Having in view these objects and others which will be pointed out in the following description, I will now refer to the drawing, in which Figure 1 is a plan view of the cutting head showing also the relation of the hammers of the reel to the cutting head.

Figure 2 is a sectional view on the line 2—2 of Figure 1 looking in the direction of the arrows.

Figure 3 is a sectional view on the line 3—3 of Figure 1 looking in the direction of the arrows.

Figure 4 is a view in perspective of one of the knives.

The cutting head 10 is located at the feed opening over the cylinder which carries the hammers 11. The cutting head is concave in form and concentric with the reel shaft carrying the hammers 11 and it is provided with a plurality of cutting knives 12 between which the hammers 11 are driven at a relatively high speed of rotation.

Except for the knives 12, the cutter head is in the form of an integral casting. A box like structure 13 projects both above and below the surface of the casting. Through the floor of this casting is a plurality of slots for the reception of the knives 12. These knives include an exposed part with a knife edge 12a and a base having a bolt hole 12b for the reception of a bolt 14 which passes through the aligned bolt holes 12b and through the bolt holes in the curved side edges of the casting.

It is to be noted that the maximum depth and width of each knife is uniform throughout its length so that the knife can be slid through from the outside. As shown in Figure 3, the box-like structure is hollow on the outer side, this providing finger space for moving the knives into position to receive the bolt 14.

The knives 12 are so positioned that they lie in the path of the incoming feed. The cutting edges 12a are directed rearwardly. The hammers 11 force the feed against the cutting edges 12a to cut the feed into short lengths. It should be noted that the hammers 11 and the knives are alternated so that a hammer will travel between two adjacent knives to result in a shearing effect on the feed, the space between the hammers and the knife being sufficient to avoid clashing between them resulting in possible injury of the knives or hammers.

In the rear of the knives is a ridge 15 against which the feed is hurled after it has been cut by the knives 12. The ridge is triangular in section as best shown in Figure 2 and it is integral with the remainder of the casting. The impact of the feed with the ridge 15 after the feed has been passed through the knife assembly further breaks up the feed.

The cutter head as above described is secured in place in the mill casing at the feed opening and above the hammer reel. It is positively held in place by any of the securing means which are well known to the operators of feed grinders, such as an arcuate groove in each of the lateral walls of the mill casing. The casting in the present instance is provided with slots 16 for the reception of bolts adapted to pass through the side walls of the mill casing and securely holding the casting in place. Since these are all well known and since they do not form part of my invention, illustration is thought to be unnecessary.

Ear corn and other grains are ground without difficulty. Corn stalks are cut up into small sections by the knives 12 and then ground up. The prior grinders have more or less difficulty in damp weather with corn stalks and other fibrous feed material. Silage is cut green. The same is true of sorgo, but the cutter head as above described will cut and otherwise reduce all of these feeds without danger of clogging the mill, the same being true when damp tough hay is fed through the mill.

Having thus described my invention in such full, clear, and exact terms that its construction and operation will be readily understood by others skilled in the art to which it pertains, what I claim as new and desire to secure by Letters Patent of the United States is:

1. A cutter head for feed grinders including a plate member and a plurality of cutting knives, the maximum depth and width of each knife being uniform throughout its length, said plate member having a plurality of apertures of substantially the same cross sectional area as the maximum cross sectional area of said cutter knives and through which said knives extend, said knives being firmly held against lateral movement by the walls of said apertures, said plate member further having a rim projecting outwardly therefrom to form a hollow elongated box-like structure of a width of the same extent as the depth of said cutter knives and engaging the edges of said knives to further hold said knives, and a bolt extending through the opposite end walls of said box-like structure and transversely through said cutter knives to retain all of said cutter knives against longitudinal movement in either direction.

2. A cutter head for feed grinders, including a concave plate member and a plurality of cutting knives, said concave plate member having a concave inner surface and a plurality of apertures of substantially the same cross sectional area as said cutter knives and through which said knives extend, said knives being firmly held against lateral movement by the walls of said apertures, said plate member further having a rim projecting outwardly therefrom to form a box-like structure of a width of the same extent as the depth of said cutter knives and engaging the edges of said knives to further hold said knives, a bolt extending through the opposite end walls of said box-like structure and transversely through said cutter knives to retain all of said cutter knives against longitudinal movement in either direction, and a continuous ridge in rear of said knives projecting from said concave inner surface and bridging the spaces between the knives, said ridge acting to intercept the particles of cut feed to further reduce the size of particles of feed, and the wall of said ridge adjacent said knives being inclined to prevent the accumulation of feed thereagainst.

3. In a feed grinder having a casing and a rotatable hammer wheel comprising a plurality of spaced hammers presenting blunt surfaces in the direction of movement thereof, a stationary cutter head secured to and forming a section of the casing, said cutter head including a concave member thickened along a medial band, a plurality of aligned slots passing through said member at the thickened band thereof, cutting knives having rearwardly directed knife edges removably inserted in the aligned slots, said slots being so spaced that said knives are spaced apart a distance greater than the thickness of the hammers and are alternated with the hammers whereby the hammers will pass between said knives during the rotation of said reel, a bolt passing longitudinally through said thickened band and transversely through said knives for releasably securing said knives in said slots, and a continuous ridge in rear of said knives projecting from the inner surface of said concave member and bridging the spaces between the knives, said ridge acting to intercept the particles of cut feed to further reduce the size of particles of feed, and the wall of said ridge adjacent said knives being inclined to prevent the accumulation of feed thereagainst.

4. A cutter head for feed grinders, said cutter head including a concave casting and cutting knives for severing fibrous feeds into small particles, said casting having a concave inner surface and being provided with a plurality of aligned slots for the reception of said knives with said knives protruding radially inwardly from the concave surface of said casting and with the cutting edges thereof directed toward the incoming feed, and a continuous triangular ridge on said casting in the rear of said knives projecting from said concave inner surface and bridging the spaces between the knives for intercepting the particles of cut feed to further reduce the size of the particles of feed.

STEPHEN RAYMOND GATELY.